United States Patent [19]
Howe et al.

[11] Patent Number: 5,272,418
[45] Date of Patent: * Dec. 21, 1993

[54] TIME ENABLED PHOTOSENSING CIRCUIT

[75] Inventors: David J. Howe, Milford; W. James Budzyna, Whitinisville, both of Mass.

[73] Assignee: Universal Electronics, Inc., Peninsula, Ohio

[*] Notice: The portion of the term of this patent subsequent to Sep. 21, 2008 has been disclaimed.

[21] Appl. No.: 462,692

[22] Filed: Jan. 9, 1990

[51] Int. Cl.$^5$ .......................................... H05B 37/02
[52] U.S. Cl. .................................. 315/159; 315/360; 250/214 AL
[58] Field of Search ................ 315/159, 158, 149, 156, 315/152, 129, 316, 360, 307; 250/214 AL, 210, 206

[56] References Cited

U.S. PATENT DOCUMENTS

| | | | |
|---|---|---|---|
| 2,838,716 | 6/1958 | Spierer | 315/152 |
| 3,080,491 | 3/1963 | Howell | 307/117 |
| 3,421,005 | 1/1969 | Baker | 250/206 |
| 3,450,939 | 6/1969 | Misencik | 315/156 |
| 3,483,429 | 12/1969 | Engel et al. | 315/156 |
| 3,629,649 | 12/1971 | Del Zotto | 315/159 |
| 3,636,357 | 1/1972 | Del Zotto | 250/210 |
| 3,900,763 | 8/1975 | Turner | 315/156 |
| 3,901,813 | 8/1975 | Potopinski | 250/209 |
| 4,008,415 | 2/1977 | De Avila-Serafin et al. | 315/156 |
| 4,023,035 | 5/1977 | Rodriguez | 315/159 X |
| 4,207,501 | 6/1980 | Smallegan | 315/159 |
| 4,575,659 | 3/1986 | Pezzolo et al. | 315/159 |
| 4,588,926 | 5/1984 | Pezzolo | 315/155 |
| 4,645,980 | 2/1987 | Yang | 315/159 |
| 4,851,738 | 7/1989 | Yang | 315/159 |

FOREIGN PATENT DOCUMENTS 3026195 1/1981 Fed. Rep. of Germany ...... 315/159

OTHER PUBLICATIONS

Dusk-To-Dawn by R. A: (Penfold Article) from Radio & Electronics Constructor (GB) vol. 33, No. 10, Jun. 1980.
Rohm IC Application Data, dated Nov. 5, 1986.

Primary Examiner—Eugene R. LaRoche
Assistant Examiner—Ali Neyzari

[57] ABSTRACT

A switching control circuit for energizing a lamp in response to a decrease in ambient light below a predetermined level includes a photosensor and a timer circuit that responds to the photosensor indicating that the ambient light level is below a predetermined level by gating a solid state switching device into conductance to energize the lamp. The photosensor is powered by the signal that gates the switching device in a manner that renders the photosensor operative only when the lamp is not energized. Therefore, the lamp is energized upon the onset of dusk for a predetermined period of time during which the photosensor is disabled. After the period of time has expired, the lamp is deenergized and the photosensor is again enabled for a brief period of time to determine whether ambient light is still below the predetermined level. If it is, the light is again energized for another period of time. If not, the light remains deenergized.

16 Claims, 2 Drawing Sheets

TIME ENABLED PHOTOSENSING CIRCUIT

BACKGROUND OF THE INVENTION

The present invention relates to photosensing switching devices. More particularly, the present invention provides control of a lamp as a function of the ambient light level. The present invention is especially adapted for use with existing lighting fixtures.

Various switching control circuits have been proposed to provide automatic and unattended operation of outdoor and indoor lighting systems. Such circuits often employ a photosensing device to energize one or more lamps in response to ambient light levels, from dusk to dawn. A common problem with such switching control circuits is that the photosensing device often will sense the controlled lamp as ambient lighting, producing a flickering of the lamp. The switching control circuit switches the controlled lamp on in response to sensing a diminished ambient light level and then switches the controlled lamp off in response to sensing light produced by the controlled lamp, which is mistaken for the ambient light level. The prior art has attempted to resolve this flickering problem with sophisticated circuitry including delay circuits and multiple photosensors.

Another problem with prior art switch control circuits is that those employing thyristors or triacs, which control lamp operation by adjusting the phase angle of the gating signal. Such phase controlled circuits produce a substantial voltage drop across the thyristor which significantly reduces the voltage available for lighting and waste power.

SUMMARY OF THE INVENTION

The present invention overcomes the flickering effect while providing a totally solid state switching control circuit that delivers substantially all available power to the lamp. A lamp control circuit according to the present invention includes switch means that is responsive to a signal being provided to its input for selectively connecting a power source and a lamp. A photosensing means is responsive to ambient light levels for producing a first signal when ambient light is below a predetermined level provided that the photosensing means is not disabled. Circuit means are provided that initiate a second signal in response to the first signal and provide the second signal to the input of the switch means. Disabling means disable the photosensing means when the switch means is connecting the lamp to the power source. In this manner, the photosensing means is only enabled when the lamp is off and is disabled as soon as the lamp is energized to avoid responding to the lamp's output. In a preferred embodiment, the circuit means includes a timer which produces the second signal for a predetermined period of time, such as one hour, in response to the first signal. In this manner, the lamp is extinguished and the photosensing means enabled occasionally for a brief moment. If the ambient level is still below the predetermined level, the lamp will be reenergized. If not, the lamp will remain deenergized.

These and other objects, advantages and features of the present invention will become apparent upon review of the following specification in conjunction with the drawings.

DESCRIPTION OF THE PREFERRED EMBODIMENT

Figure 1:
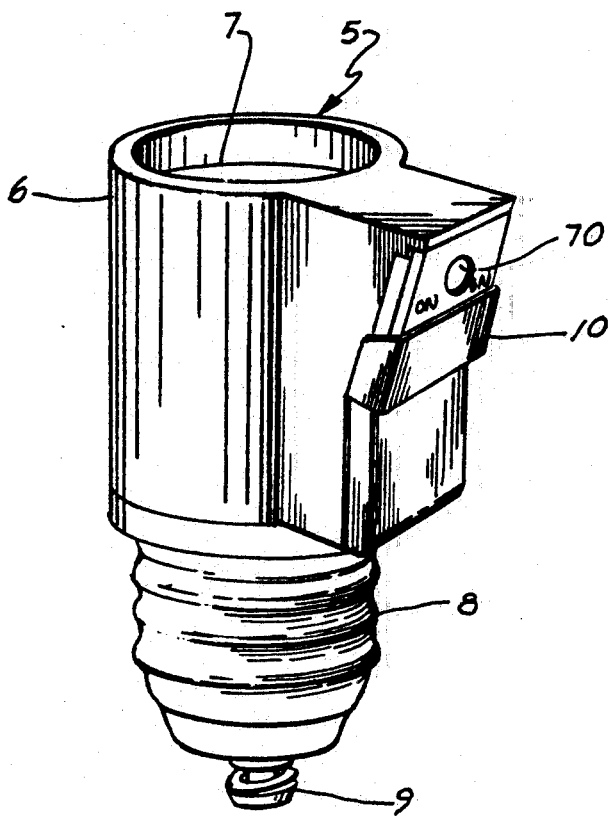
FIG. 1 is a device which includes a lamp switching control circuit according to the invention positioned within a housing.
Figure 2:
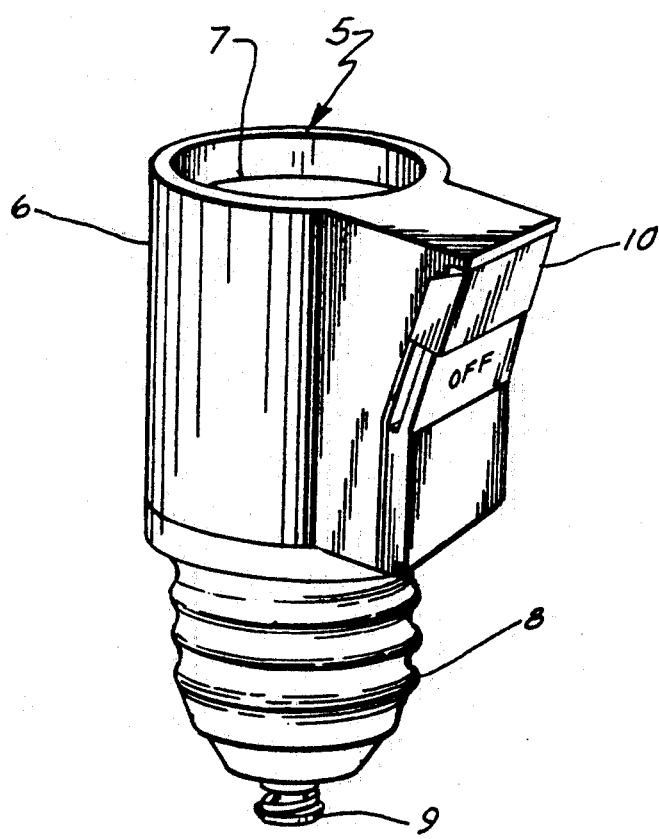
FIG. 2 is a view of the device in FIG. 1 placed in a non-operative mode.

Referring now to the drawing and the illustrative embodiment depicted therein, a lamp control device 5 includes a housing 6 having a standard lamp socket 7 at one end and contacts 8 and 9, configured to engage a standard lamp socket, at an opposite end. A lamp switching control circuit 4 is located within housing 6 and includes a photoresistor 70 positioned in an opening in housing 6. Photoresistor 70 is selectively coverable by a slidable shade member 10. When shade member 10 is positioned over photoresistor 70, as illustrated in FIG. 2, photoresistor 70 is "tricked" into responding as if a night, or low ambient light, condition exists. This has the effect of causing lamp control device 5 to attempt to perpetually energize a lamp 24 engaged with socket 7 so that control of the lamp will be through other means, such as by switching power supplied to contacts 8 and 9. Shade member 10 may additionally be positioned partially covering photoresistor 70. In such an intermediate position, shade member 10 reduces the amount of ambient light reaching photoresistor 70 and functions to adjust the predetermined level to which circuit 4 responds.

Figure 3:
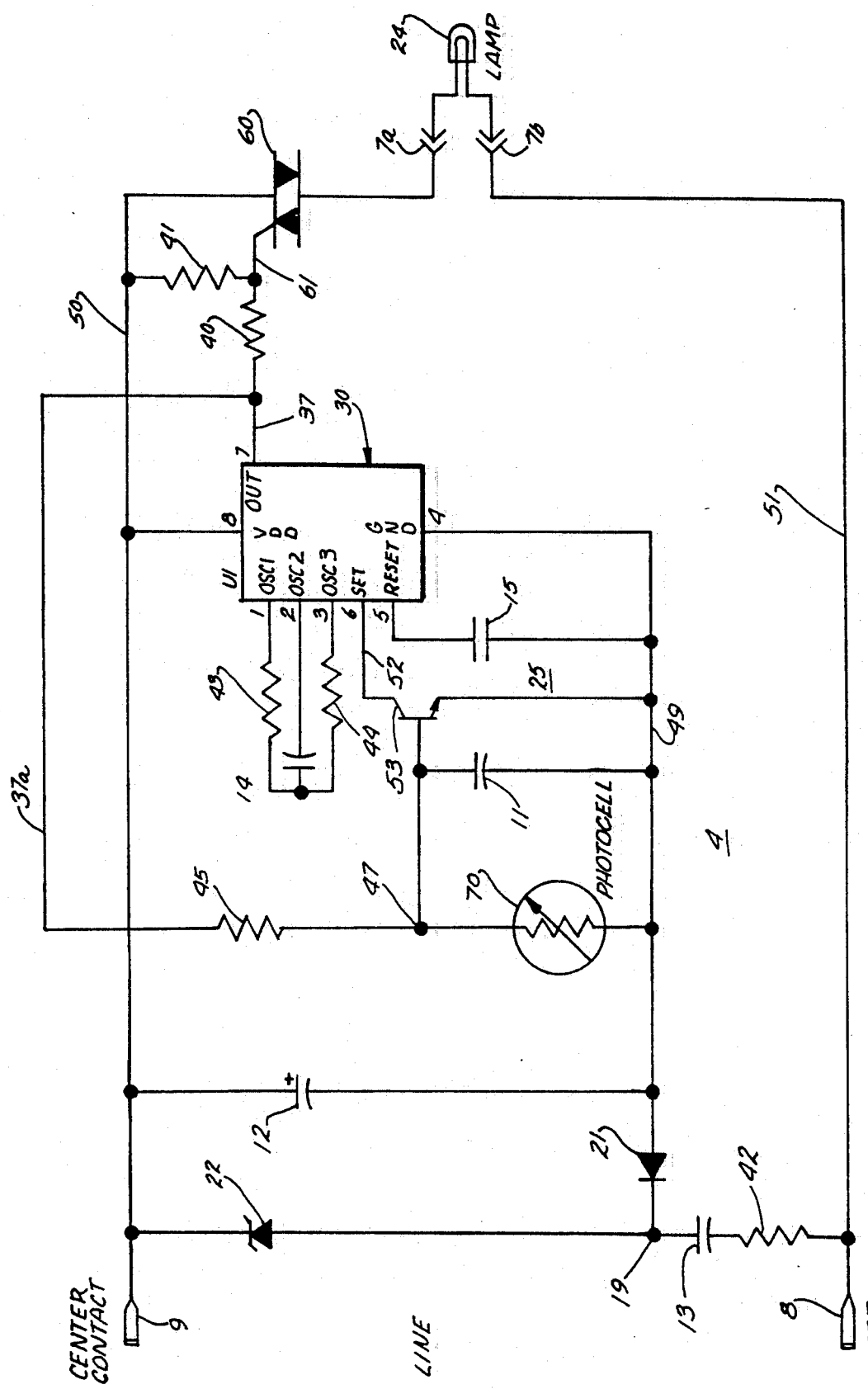
FIG. 3 is an electrical schematic diagram of a lamp switching control circuit according to the present invention.

Referring to FIG. 3, lamp switching control circuit 4 includes switching means, such as a thyristor or triac 60, that selectively connects a lamp 24 with a power line 50 and a neutral line 51. Triac 60 is selectively actuated by a gating circuit, generally shown at 25, which produces an output signal on line 37 connected with the gating terminal 61 of triac 60.

Gating circuit 25 includes a condition sensing device, such as a light sensing photoresistor 70 and timing means, generally shown at 30, for producing an output signal on line 37 for a predetermined period of time after receiving an input signal on its "set" line 52. A transistor 53 is connected in an open-collector configuration between line 52 and a signal ground line 49. The base of transistor 53 is connected to a signal ground line 49 through a capacitor 11 and to a junction 47 between photoresistor 70 and one terminal of a resistor 45. The other terminal of resistor 45 is connected with line 37 through a line 37a.

A resistor 42, capacitor 13 and zener diode 22 are serially connected between neutral line 51 and power line 50. Junction 19 between zener diode 22 and capacitor 13 is connected through a diode 21 to signal ground line 49. A filter capacitor 12 is connected between power line 50 and signal ground line 49. This arrangement produces a regulated DC voltage between power line 50 and signal ground line 49, with signal ground line 49 more negative than power line 50 an amount equal to the value of zener diode 22. However, signal ground line 49 "floats" with respect to neutral line 51. A capacitor 15 is connected between a reset contact 35 and signal ground line 49 to reset timer circuit 30 upon power up. Resistors 43 and 44 and capacitor 14 establish the time constant for timer circuit 30. Their respective values determine the duration of a pulse produced on line 37 in response to a momentary grounding of set line 52. This duration is approximately one hour in the illustrated embodiment.

In operation, the resistance of photoresistor 70 varies inversely to the light received by photoresistor 70. Thus, photoresistor 70 has low resistance with high levels of ambient light, causing the voltage across photoresistor 70 to be below that necessary to drive transistor 53 into a conducting state. However, when ambient light diminishes, the resistance of photoresistor 70 increases, causing an increase in voltage at the base of transistor 53. The voltage at its base required to switch transistor 53 into a conducting state is accomplished when ambient light drops below a predetermined level. With transistor 53 conducting, set input 52 of timer circuit 30 is shorted to signal ground which causes the timed output 37 of timer circuit 30 to be set to the voltage level of signal ground line 49. With the timed output 37 switched "low," the voltage at gate 61 with respect to power line 50 is increased to a level sufficient to gate triac 60 into conduction which applies the full AC line voltage between lines 50 and 51 across terminals 7a and 7b of lamp 24 for the duration of the timed cycle of timer circuit 30. While output 37 is "low," there is substantially no voltage difference between line 37a and signal ground line 49. Therefore, no voltage drop exists across resistor 45 and photoresistor 70. Thus, whenever timer circuit 30 is gating thyristor 60 into conducting, photoresistor 70 is disabled from developing an ambient light signal on junction 47 and transistor 53 is precluded from conducting.

At the end of the timed cycle of timer circuit 30, the voltage level at output 37 goes "high" with respect to signal ground line 49. The voltage between gating terminal 61 of triac 60 and power line 50 is below that required to keep triac 60 conducting and power is removed from lamp 24. However, the rise in voltage on output 37 with respect to signal ground line 49 establishes a voltage drop across resistor 45 and photoresistor 70. If the ambient light level is below the predetermined level, the resistance of photoresistor 70 is sufficiently high to cause the voltage at the base of transistor 53 to switch transistor 53 into conduction. The timed output of device 30 is again set and the cycle is repeated. This cycle is repeated until ambient light level increases above the predetermined level at which the resistance of photoresistor 70 is no longer sufficiently high to provide the required gating voltage to the base of transistor 53 to set timer circuit 30. When this occurs, lamp 24 remain deenergized.

Thus, photoresistor 70 is disabled whenever triac 60 is conducting current to energize lamp 24. Periodically, timer circuit 30 disrupts the gating signal to triac 60 to deenergize the lamp while simultaneously enabling the photoresistor for a brief period, established by the RC time constant of resistor 45 and capacitor 11. During this brief period, established at approximately 0.2 second, lamp 24 "blinks" off and the ambient light level is "sampled." Because this "sampling" period is short and occurs infrequently, approximately once per hour in the illustrated embodiment, the blinking is not noticeable. In this manner, the lamp is switched on at dusk and off after dawn, within the interval established by timer circuit 30, without any flicker. The triac is either fully conducting or fully non-conducting so only negligible power is dissipated in the switching device.

In the illustrated embodiment, timer circuit 30 is a BU2300A timer circuit, which is commercially available and sold by Rohm Co., Ltd. Values of components used in the illustrated embodiment are as follows:

| | |
|---|---|
| Capacitor 11 | 0.022 uF |
| 12 | 100 uF |
| 13 | 0.47 uF |
| 14 | 0.0018 uF |
| 15 | 0.1 uF |
| Resistor 40 | 420 ohms |
| 41 | 22 Kilohms |
| 42 | 220 ohms |
| 43 | 470 Kilohms |
| 44 | 220 Kilohms |
| 45 | 360 Kilohms |
| Zener Diode 22 | IN4734A(5.6 V) |

The above description is considered that of the preferred embodiment only. Modifications of the invention will occur to those who make or use the invention. Therefore, it is understood that the embodiment shown in the drawings and described above is merely for illustrative purposes and is not intended to limit the scope of the invention, which is defined by the following claims as interpreted, according to the principles of patent law including the doctrine of equivalents.

The embodiments of the invention in which an exclusive property or privilege is claimed are defined as follows:

1. A lamp control circuit for controlling the application of electrical energy from a power source to a lamp comprising:
   switch means having an input and being responsive to a signal provided to said input for selectively electrically connecting said power source and said lamp in order to cause current to flow from said power source to said lamp;
   photosensing means responsive to ambient light level for producing a first signal when said ambient light level is below a predetermined level provided that said photosensing means is not disabled;
   circuit means responsive to said first signal for initiating a second signal, said second signal being provided to said switch means input; and
   disabling means for disabling said photosensing means when said switch means is selectively electrically connecting said power source and said lamp, wherein said disabling means includes means for providing said second signal to said photosensing means in a manner that said photosensing means is operative only in the absence of said second signal.

2. The lamp control circuit in claim 1 wherein said circuit means includes timing means responsive to said first signal for producing said second signal for a predetermined period of time after responding to said first signal.

3. The lamp control circuit in claim 2 wherein said period of time is approximately one hour.

4. The lamp control circuit in claim 1 further including a wall defining a housing, means defining an opening in said wall and a shutter selectively positionable over at least a portion of said opening; said photosensing means being positioned in said housing behind said opening such that said shutter may regulate the ambient light to which said photosensing means respond.

5. A lamp control circuit for controlling the application of electrical energy from a power source to a lamp comprising:

photosensing means for determining that ambient light level is below predetermined level;

timed switch means for connecting said lamp for a predetermined period of time with said power source in order to cause current to flow from said power source to said lamp in response to said photosensing means determining that said ambient light level is below said predetermined level, wherein said timed switch means includes a timer circuit and switch means, said timer circuit having an input responsive to said photosensing means and an output, said output assuming a first state for said predetermined period of time after said photosensing means determines that said ambient light level is below said predetermined level and a second state after said predetermined period of time, wherein said switch means selectively connects said lamp with said power source in response to said output being in said first state; and wherein said timed switch means disables said photosensing means during said predetermined period of time that said output is in said first state.

6. The lamp control circuit in claim 5 wherein said timed switch means is a solid state switch including a gating terminal and a pair of switched terminals, said gating terminal being connected with said output, said switched terminals selectively connecting said lamp with said power source.

7. The lamp control circuit in claim 6 wherein said photosensing means includes a photodetection device connected with said output and operative to produce an ambient light signal only when said output is in said second state.

8. The lamp control circuit in claim 5 further including a wall defining a housing, means defining an opening in said wall and a shutter selectively positionable over at least a portion of said opening; said photosensing means being positioned in said housing behind said opening such that said shutter may regulate the ambient light to which said photosensing means respond.

9. A lamp control circuit for controlling the application of electrical energy from a power source having a power line and a neutral line to a lamp having first and second terminals, said control circuit comprising:

timer circuit means having an input terminal and an output terminal; said timer circuit means being for switching the signal on said output terminal from a first voltage level to a second voltage level for a predetermined period of time after an input signal is applied to said input terminal;

semiconductor switching means having first and second power terminals and a gating terminal for establishing a current between said first and second power terminals in response to said second voltage being applied to said gating terminal with respect to said first power terminal; said gating terminal being connected with said output terminal, said first power terminal being connected with said power line, said second power terminal being connected with one terminal of said lamp and said second terminal of said lamp being connected with said neutral line; and photosensing means having a power terminal and a switched terminal for producing said input signal for said timer circuit means when the level of ambient light is below a predetermined level provided that said first voltage level is being applied to said power terminal, said power terminal being connected with said output terminal and said switched terminal being connected with said input terminal.

10. The lamp control circuit in claim 9 wherein said photosensing means includes a resistor and a photosensitive device connected together at a junction and in series with said power terminal.

11. The lamp control circuit in claim 10 wherein said photosensitive device is a variable resistance device.

12. The lamp control circuit in claim 9 further including a wall defining a housing, means defining an opening in said wall and a shutter selectively positionable over at least a portion of said opening; said photosensing means being positioned in said housing behind said opening such that said shutter may regulate the ambient light to which said photosensing means respond.

13. A lamp control circuit for controlling the application of electrical energy from an AC power source having a power line and a neutral line to a lamp having first and second terminals, said control circuit comprising:

voltage regulation means connected with said power and neutral lines for establishing a regulated DC voltage between a signal ground line and said power line;

timer circuit means having first and second power terminals, an input terminal and an output terminal; said power terminals being connected respectively with said power line and said signal ground line; said timer circuit means being for switching the signal on said output terminal from said DC voltage to the voltage level on said signal ground line for a predetermined period of time after an input signal is applied to said input terminal;

semiconductor switching means having third and fourth power terminals and a gating terminal for establishing a current between said third and fourth power terminals in response to said voltage level on said signal ground line being applied to said gating terminal; said gating terminal being connected with said output terminal, said third power terminal being connected with said power line, said fourth power terminal being connected with one terminal of said lamp and said second terminal of said lamp being connected with said neutral line; and photosensing means for producing an input signal for said timer circuit means when the level of ambient light is below a predetermined level; said photosensing means having fifth and sixth power terminals and a switched terminal; said fifth and sixth power terminals being connected respectively with said output terminal and said signal ground line and said switched terminal being connected with said input terminal.

14. The lamp control circuit in claim 13 wherein said photosensing means includes a resistor and a photosensitive device connected together at a junction and in series with said fifth and sixth power terminals.

15. The lamp control circuit in claim 14 wherein said photosensing means further includes a transistor having a base, collector and emitter, said base being connected with said junction, said collector being connected with said switched terminal and said emitter being connected with said signal ground line.

16. The lamp control circuit in claim 13 further including a wall defining a housing, means defining an opening in said wall and a shutter selectively positionable over at least a portion of said opening; said photosensing means being positioned behind said opening such that said shutter may regulate the ambient light to which said photosensing means responds.

* * * * *